United States Patent [19]

Gallant

[11] Patent Number: 4,648,036
[45] Date of Patent: Mar. 3, 1987

[54] METHOD FOR CONTROLLING QUERY AND UPDATE PROCESSING IN A DATABASE SYSTEM

[75] Inventor: John K. Gallant, Westerville, Ohio

[73] Assignee: AT&T Bell Laboratories, Murray Hill, N.J.

[21] Appl. No.: 708,963

[22] Filed: Mar. 6, 1985

[51] Int. Cl.$^4$ ............................................. G06F 15/40
[52] U.S. Cl. .................................................. 364/300
[58] Field of Search ......................................... 364/300

[56] References Cited

U.S. PATENT DOCUMENTS 4,506,326  3/1985  Shaw et al. ........................ 364/300

OTHER PUBLICATIONS

IEEE—1979—"Locking Policies: Safety and Freedom from Deadlock"—pp. 286-297—Yannakakis-Papadimitriou-Kung.

IEEE—1981—"Transaction Monitoring in Encompass [TM]: Reliable Distribute Transaction Processing-"—pp. 155-165—Borr.

IEEE—1983—"A Case for Non-Two Phase Locking Protocols that Ensure Atomicity"—pp. 535-538.

Primary Examiner—Raulfe B. Zache
Attorney, Agent, or Firm—Jerry W. Herndon

[57] ABSTRACT

A method of performing update transactions in a database system to perserve consistent logical data states at all times. Each changeable data entry in the database is associated with an individual code field. When no update transaction is in progress, every code field is set to a first value. An update transaction is begun by changing a system state parameter from a NON-UPDATE to an UPDATE state. During the UPDATE state, the code fields of data entries to be added are marked with a second value and then inserted into the database. Code fields of entries to be deleted are marked with a third value. When this is complete, the system state parameter is set to a POST-UPDATE state. All code fields are then returned to the first value at which time the system is returned to the NON-UPDATE state. During the UPDATE state, all queries are given access to entries with first and third code field value. Conversely during the POST-UPDATE state, queries are allowed access only to entries with first and second code field values.

6 Claims, 8 Drawing Figures

FIG. 1
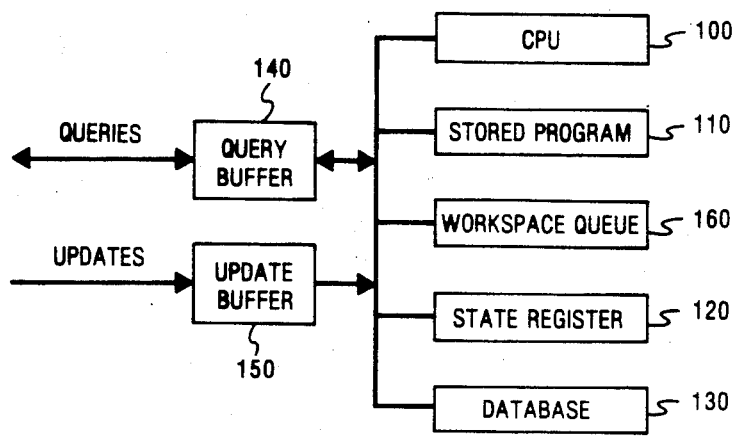
FIG. 2
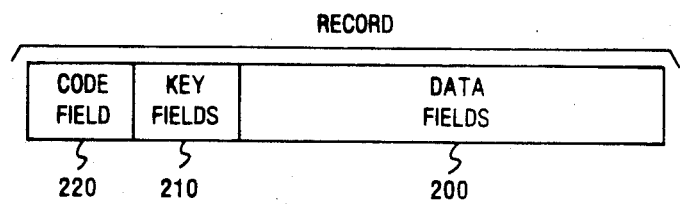
FIG. 3
```
UPDATE_MESSAGE
    INSERT 10 (1) 5
    DELETE 20 (1)
    DELETE  1 (2)
    INSERT  1 (2) 1, 2
END_UPDATE
```

METHOD FOR CONTROLLING QUERY AND UPDATE PROCESSING IN A DATABASE SYSTEM

TECHNICAL FIELD

The invention relates to database systems in general and, in particular, to methods of controlling concurrent database query and update functions to maintain consistent logical states of the database at all times.

BACKGROUND OF THE INVENTION

Database concurrency control is the control process in a database system that allows interactive querying and updating of the stored data contents of the database system. The purpose of concurrency control is to ensure that the logical state of the database is consistent at all times. This means, for example, if a query and an update process are in progress at the same time, the query will receive the appropriate database information that existed before the update process began or, possibly, information that exists after the update process is completely finished. The query should not receive, however, information that represents a data state after the update begins but before it completes.

The property that ensures consistent data states of a database is called "serializability." The classic method of query and update processing is to lockout query functions while an update is occurring and vice versa. Thus, queries and updates take place in a serial format in the classic method. Any algorithm that can be shown to be equivalent to the classic serial scheme can be made to result in consistent database states.

In many types of databases, the query function is more important than the update function and should, therefore, be given preference over the update function. The classic concurrency control method is lacking in this respect because queries are locked out while updates are occurring. To mitigate this problem, some databases use a technique known as "shadowing." In this technique, the database entries (entry, record, page, etc.) on which updates are based are copied into a separate portion of memory that is not yet part of the present contents of the database. Update changes are then made to the copies. While, the "shadow" changes are being made, queries are referred to the unchanged database. When updating of the "shadow" copies is complete, queries are temporarily locked out and database linkages are then modified to point to the "shadow" copies rather than to the old data entries. Querying is then reallowed. The result is that queries are locked out for a shorter period of time than in the classic method.

While "shadowing" works well, it is clear that the control structure, i.e., the software, necessary to accomplish the result, is complicated. This is due in large part to the fact that different logic must be provided to account for the different types of semipermanent and temporary data structures present in such a system, i.e., the database memory, the "shadow" memory, the linkages that point to one or the other and administrative control functions. It is desirable to simplify the control structure and at the same time further shorten the time that query functions are locked out by updates, if possible.

SUMMARY OF THE INVENTION

The above problems are solved and an advance in the art is achieved in a method of controlling query and update processing in a database system. Database update transactions may include database entry insert and delete commands. Insert commands result in the addition of new data entries to the database structure, whereas delete commands result in the elimination of existing entries. In response to such a transaction, individual entries to be inserted are marked as being part of a future database structure and are then added to the database in a homogeneous fashion. Existing entires which are to be deleted are individually marked as such in the present database structure. At the completion of the marking procedure, a system state parameter is marked indicating a switch from the present database structure to the future database structure. As a result, the present structure immediately becomes an old structure and the future database structure becomes the present structure. A query process always accesses the present database structure as it is defined by the system state parameter at any given time. Only entries belonging to the presently defined database structure are returned to the query process.

In the preferred embodiment of the invention, each changeable entry of the database (entry, page, record, etc.) is associated with an individual code field value. There are at least three system states associated with a system state parameter, NON-UPDATE, UPDATE and POST-UPDATE. In the NON-UPDATE system state, all code field values for the data entries are set to a first value. The system is placed into the UPDATE state when an update transaction is received. During this state, the code fields of data entries being inserted are set to a second value. The code fields of entries being deleted are marked with a third value. Queries processed during the UPDATE state are given access only to entries marked with the first value (signifying entries unaffected by any concurrent update transaction) or with the third value (signifying entries marked for deletion, but still defined as being part of the present database structure). Entries having the second code field values are considered part of a future structure and are not accessible in this system state.

When all entries affected by a transaction are marked during the UPDATE state, the system state is switched to the POST-UPDATE state. At this point, the present database structure becomes the old structure and the future structure becomes the present structure. Queries processed during the POST-UPDATE state are given access to entries having first (unaffected entries) and second (inserted entries) code field values. Entries with third code field values are now not considered part of the present structure.

During the POST-UPDATE state, all entries affected by an update transaction are cleaned up. Entries that have been deleted are erased from the system to free-up the memory space. The code fields of entries that have been added are set to the first value. When this is completed, the system is placed into the NON-UPDATE state in readiness for the next update transaction.

This method has the following advantages over the prior art. The database structure is homogeneous. Thus, there is no need for control structures to account for special cases such as "shadow" pages. There is effectively no interval of time that query processes are locked out due to an update transaction because only a system state parameter need be changed to switch from present to future data structures. Finally, update processing during the UPDATE and POST-UPDATE states may be performed at low priority during system idle time, while query processes are concurrently served at high priority, such at interrupt level.

BRIEF DESCRIPTION OF THE DRAWING

FIG. 1 shows a functional entry diagram of an illustrative database system used to describe the invention;

FIG. 2 shows an illustrative format of a fundamental changeable data entry, from now on referred to as a record in the database. The illustrative record includes one or more key fields on which searches may be made, one or more data fields, and a code field which indicates, in conjunction with a system state parameter, whether or not the record belongs to a present version on an old version or to a future version of the database;

FIG. 3 shows an illustrative update transaction, including record insert and delete commands, used to illustrate the operation of the invention;

DETAILED DESCRIPTION

Figure 4:
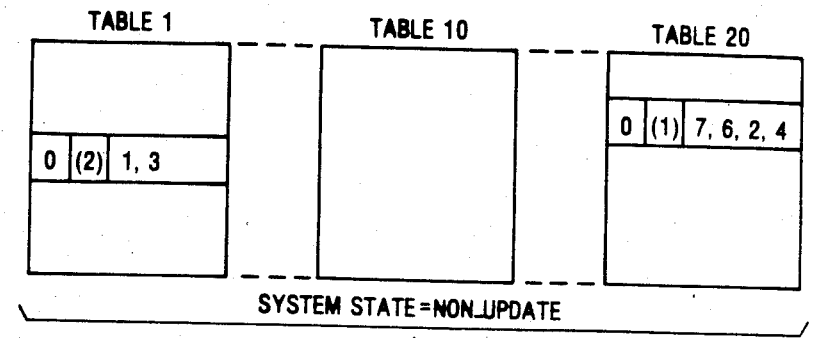
FIGS. 4 through 6 each show illustrative data tables containing the records of FIG. 3 and the contents of those records in each of three system states UPDATE, NON-UPDATE, and POST-UPDATE.

The illustrative database system shown in FIG. 1 comprises a central processing entry (CPU) 100 operated under control of a stored program 110. A state register 120 contains an indication of the present update state of the system. Only three states are necessary in my illustrative embodiment. A NON-UPDATE state in which no update processing is in progress, an UPDATE state during which an update transaction is being processed and a POST-UPDATE state during which, as will be seen, bookkeeping operations are performed on changed or deleted records before returning the system state to the NON-UPDATE state. The actual database records are maintained in a database entity 130. Queries to search the database arrive in a query buffer 140. Queries are served by CPU 100 on a first come-first serve basis. Information found as a result of a query are returned to a user process via the query buffer 140. Similarly, update transactions arrive from a user process via an update buffer 150 and are served in order by CPU 100. As records are added or deleted to or from the database in response to an update transaction, the identities of the effected records are placed in a workspace queue 160. The workspace queue 160 is used during the POST-UPDATE state by CPU 100 to accomplish the above-mentioned bookkeeping operations preparatory to returning the system to the NON-UPDATE state.

Although each of the functional entities, 110 through 160, are shown separately in FIG. 1, in a practical implementation each might reside, for example, in some dedicated part of the main memory of the database system. Database 130 illustratively comprises a plurality of data tables each identified by unique table numbers. Each table, in turn, is made up of one or more records. An illustrative format of a single record is shown in FIG. 2. The actual data contained in a record is in data fields 200. The format of the data fields is arbitrary and unimportant for purposes of this invention. For our purposes, it is assumed that the number of data fields present in 200 is defined by a user when a table format is defined. The record also contains one or more key fields 210 which contain relevant search parameters for a given table. The format and contents of the key field are likewise defined by a user when the format of a table is initially defined.

Every record has automatically associated with it a code field 220, which is used in conjunction with the contents of state register 120 to determine if a given record is part of the present, old or a future database.

By way of example, code fields are assigned values having the following meanings:

| SYSTEM STATE | CODE FIELD VALUE | MEANING |
| --- | --- | --- |
| NON-UPDATE | 0 | Present database. |
| UPDATE | 0 | Present database: |
|  | 1 | Present database - marked for deletion: |
|  | 2 | Future database. |
| POST-UPDATE | 0 | Present database: |
|  | 1 | Old database - to be erased: |
|  | 2 | Present database - code field value to be set to 0. |

The use of the code field will become more apparent as we progress further with this discussion.

FIG. 3 shows an illustrative update transaction used to describe the invention herein. This is intended to reflect an actual update message as it might be typed in on a system terminal by a user. The first line, UPDATE_MESSAGE, prompts the system that this is the beginning of an update transaction. The update message is terminated with the identifier END_UPDATE. In between the initial prompt and ending identifier are the individual record insert, and delete commands. In the illustrative example of FIG. 3 there are two insert and two delete commands. Each refer to a specific record as will be discussed. By way of example, change record commands are not necessary. To change a record, the record is deleted and a new record containing the new desired data is inserted.

The first insert command in the update message of FIG. 3 is INSERT 10 (1) 5. By way of example, the 10 refers to the table number containing the record to be inserted. The number (or numbers) in parentheses is a search key parameter (the number 1 in this case). The 5 in the initial insert command is the data to be contained in data field 200 of this record. The delete command format is similar to the insert format, except that no data for field 200 need be specified. Thus, for example, the first delete command in FIG. 3 relates to table 20. A search parameter must be specified (here the number 1) to identify a specific record to be deleted in the table. The final DELETE 1 (2) and INSERT 1 (2) 1,2 commands in FIG. 3 illustrate a situation where a record is to be modified. The delete command deletes the current record and the insert command reinserts the record with the modified data (1,2).

Figure 7:
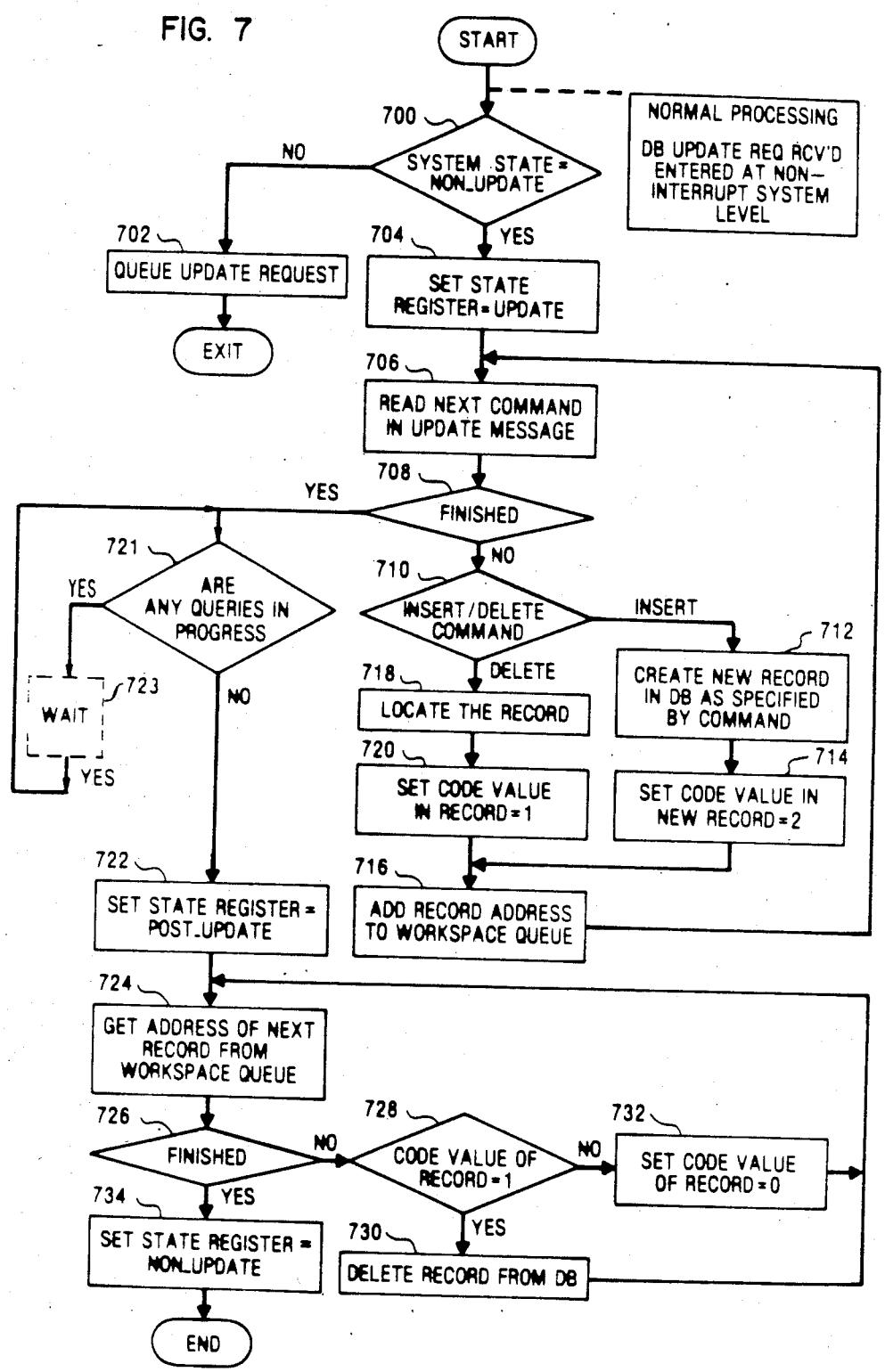
FIG. 7 is a detailed flowchart showing the method steps of processing an update request such as shown in FIG. 3.

Assume now that the update transaction of FIG. 3 arrives from an appropriate user process into query buffer 140. In the normal course of processing, CPU 100 will eventually serve this transaction in the query buffer. At that time CPU 100 begins execution of the program in FIG. 7 at address START to process the request. FIG. 4 shows the state of pertinent tables 1, 10 and 20 in the database at this time. It is assumed for illustration that tables 1 and 2 have respective records (2) 1, 3 and (1) 7, 6, 2, 4; each having code field values of 0 as shown in FIG. 4.

Because an update transaction is a low priority item in this illustrative system, it is assumed, by way of example, that the entry to START is made during system idle time at noninterrupt level. Step 700 initially determines from the state register 120 if the system is in the NON-UPDATE state. If not, the system is either processing an earlier update transaction and the system is in the UPDATE state, or the system is performing bookkeeping operations for such a transaction in the POST-UPDATE state. The illustrative system serves only one update transaction at a time. Therefore, in such a case step 702 requeues the update request in query buffer 140 for subsequent processing. Assuming, however, that the system is in the NON-UPDATE state, step 704 sets state register 120 to UPDATE. The next command (the first command at this point) in the update transaction is now obtained by step 706. Since we are just beginning the update processing, this is the initial INSERT 10 (1) 5 command shown in FIG. 3. Step 708 determines that we are not yet finished with the transaction since step 706 did not receive and END_UPDATE command. Therefore, step 710 determines that the initial command is an insert and accordingly executes step 712. Step 712 creates a new record in the database as specified by the command. This is shown in table 10 of FIG. 5 as the new record (1) 5. Because this is a newly inserted record which is not yet part of the present database, step 714 sets the code field to the value 2. As will be seen, this prevents concurrent queries being served while this update transaction is processed from gaining access to the newly inserted record. Step 716 next adds the database address of this inserted record to the workspace queue 160 and returns to step 706 to repeat the process for remaining commands in the update transaction.

Step 706 now obtains the second command from the transaction which is shown to be a DELETE 20(1) in FIG. 3. As a result, step 710 causes the execution of step 718. Step 710 locates, by means of any desired search method, the record in database 130. When this is accomplished, step 720 sets the code field in the record to the value 1. This identifies the record as being marked for deletion. However, as may be seen, records marked for deletion are still part of the present database and accessible to query functions until a switch is made from the present database to the new database. The database address of this record is added to workspace queue 160 by step 716 and the above process is again repeated for remaining commands in the update transaction.

Figure 5:
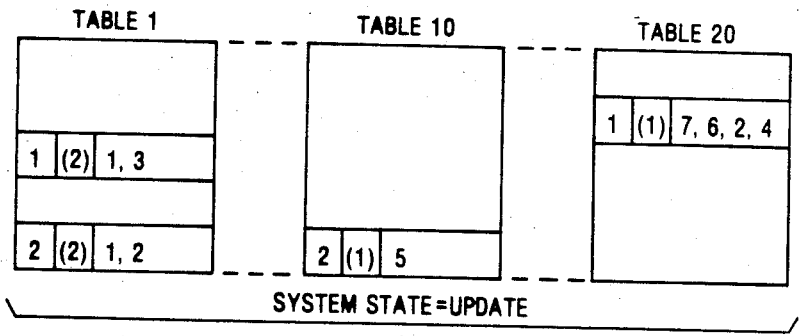

FIG. 5 shows the pertinent data states of tables 1, 10 and 20 after being processed as described above. Specifically, note that the delete and insert commands for table 1, as shown in the update transaction of FIG. 3, are reflected by two records (2) 1,3 and (2) 1,2 now in table 1. The record (2) 1,3 is marked for deletion by a code field value 1. The record (2) 1,2 is marked for insertion by the code field value of 2. Similarly, in table 10 record (1) 5 is marked for insertion by the code field value of 2 and, in table 20, record (1) 7,6,2,4 is marked for deletion by a code field value 1. When the update transaction is finished, as determined at step 708, step 721 determines, by interrogating an appropriate system flag, whether any queries are in progress in the system. This is necessary because, in accordance with the invention, database updating and querying occur concurrently. Placing the system in the POST-UPDATE while a concurrently running query is still in progress would potentially interfere with the query. Therefore, if any query is in progress, step 723 is executed. Step 723 schedules, via the executive program of the system, a prescribed time delay and re-entry to step 721. Eventually, when all system queries have completed, step 722 is executed.

Figure 6:
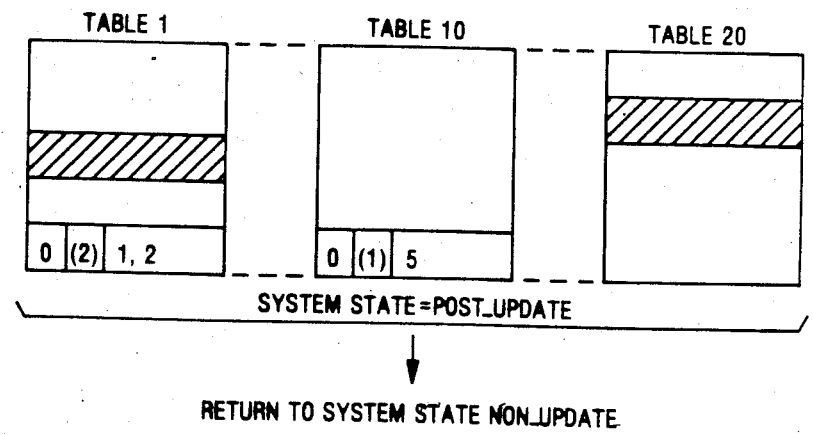

Step 722 now sets state register 120 to the POST-UPDATE state. This marks the shifting of the database from the old to the new version. Accordingly, while in the POST-UPDATE state, records marked for deletion by code field values of 1 are no longer accessible to query functions. However, records marked as newly inserted (code field values of 2) and unchanged records (code field values of 0) are query accessible. This will be seen in our discussion of FIG. 8. The START program now performs bookkeeping to operations return all records effected by the update transaction to a state in which the code field values of all database records are 0. To accomplish this, step 724 retrieves the address of a record that was effected by the update transaction from workspace queue 160. Step 726 determines if post-update processing is finished. Because we are not at the present time, step 728 is executed. Step 728 determines if the record obtained from workspace queue 160 is marked for deletion. If so, step 730 deletes the record from the database and frees up the memory space for a subsequent record. If the present record identified from the workspace queue is not marked for deletion, its respective code field value is set 0 by step 732. In either event, return is mase to step 724 to continue the post up-date processing with the next record. When all records whose addresses are contained in the workspace queue have been either deleted or returned to a code field value of 0, step 726 executes step 734, which places the system into the NON-UPDATE state. At this point in time the update transition is complete and return is made to the main program. FIG. 6 shows the states of tables 1, 10 and 20 at the completion of the POST-UPDATE state.

Figure 8:
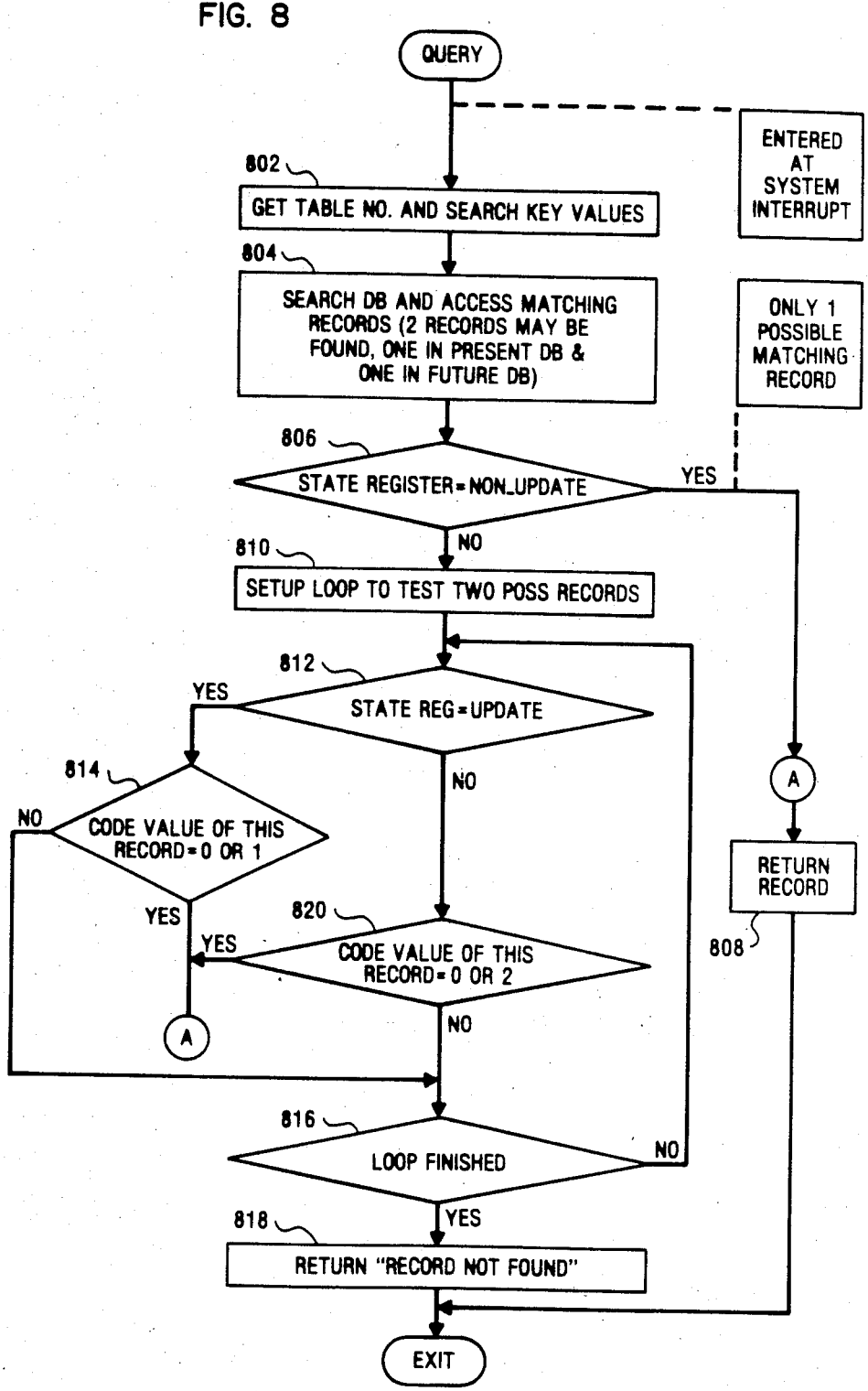
FIG. 8 shows a detailed flowchart of the method steps of processing a query function.

FIG. 8 shows an illustrative detailed flow chart of the processing of query functions. Because queries are served with high priority in this illustrative system, I assume, by way of example, that entry is made to QUERY in FIG. 8 at, for example, interrupt level. Step 802 obtains from the query request a table number and search key values. Step 804 searches the database in accordance with any desired search algorithm and fetches all records that match the search request. No records, one record or two records may be found, depending upon the system state and the search request. If no records are found, that information is returned to the query process. This is not shown in FIG. 8. At step 806, it is assumed that one or two records have been located in response to the query. If the state register 120 indicates a NON-UPDATE system state, as determined by step 806, then only one matching record has been found. This record is necessarily the record in the present database. There is no defined future database in the NON-UPDATE state causing the future database to become the present database. Accordingly, step 808 merely returns the found record to the query process and exit is made to the main program.

On the other hand, if step 806 determines that the system is not in the NON-UPDATE state, it is possible that two records may have been located in response to the search request, one belonging to a present database and one belonging to a future database. Step 810 initiates a two-pass loop to test the two possible found records. If the system is in the UPDATE state as determined by step 812, then step 814 tests the value in the code field of the record currently being examined. If that value is 0 (record unchanged) or 1 (marked for deletion) the record belongs to the present database and is returned to the user process by step 808. The second found record, if any, is not tested since there can only be one valid record at any given time. At step 814, if the code field value of the record being tested is not 0 or 1, then this record must be marked for insertion and is part of the future database. Therefore, step 816 causes the loop to be repeated for a second found record, if any. If a second record was not found, however, step 818 returns this information to the query process and exits.

At step 812, if the system state is not UPDATE, then by default the system must be in the POST-UPDATE state. It is recalled that the system has been switched from the old to the future database at the beginning of this system state causing the future database to become the present database. Therefore, step 820 determines if the code value of a found record is 0 or 2. If so, that record is returned at step 808 and exit is made to the query process. If no record is found having a code field value of 0 or 2, step 818 returns a "record not found" message and likewise terminates the query process.

It is to be understood that the above-described arrangement is merely illustrative of the application of the principles of the invention and that other arrangements may be devised by those skilled in the art without departing from the spirit and scope of the invention.

What is claimed is:

1. A method of controlling query and update processing in a database system, comprising the steps of
 in response to a database update transaction containing data insert and delete commands,
 (A) inserting data entries into the database marked as being part of a future database structure, and
 (B) marking data entries to be deleted as being part of the present database structure,
 at the completion of steps A and B, setting a system state parameter to a prescribed state indicating a switch from the present database structure to the future database structure, whereby the future database structure immediately becomes the present database structure and the prior present database structure immediately becomes an old database structure,
 in response to a database query, determining if any data entries which match the query belong to the present, to an old or to a future database structure, and
 responding to the query with only data entries that belong to the present database structure.

2. The invention of claim 1 further comprising the step of
 after setting the system state at the completion of steps A and B, erasing all database entries that are part of the old database structure.

3. A method of controlling query and update processing in a database system, comprising the steps of
 (A) setting a state parameter to an UPDATE state at the beginning of a database update transaction,
 (B) during the UPDATE state, inserting new entries of data marked as being part of a new data structure into the database and marking entries to be deleted from the database as being part of an old data structure,
 (C) in response to database queries received during the UPDATE state, returning only entries satisfying the query that are marked as being part of either the old or a present database, and
 (D) setting the state parameter to a POST-UPDATE state at the completion of step B,
 (E) during the POST-UPDATE state, marking all inserted entires as being part of the present database and erasing all entries marked for deletion,
 (F) in response to a query received during the POST-UPDATE state, returning only entires that match the query and are marked as being part of either the present or the new data structure, and
 (G) setting the state parameter to a NON-UPDATE state at the completion of the POST-UPDATE state.

4. The invention of claim 3 further comprising the step of performing step B at a low priority relative to the performing of step C.

5. The invention of claim 3 further comprising the step of performing step E at a low priority relative to the performing of step F.

6. A method of controlling query and update processing in a database system, comprising the steps of
 setting a system state parameter to a NON-UPDATE state after the completion of a first database update transaction,
 setting the state parameter to an UPDATE state at the beginning of a second update transaction,
 responsive to insert commands in the second transaction, inserting a new database record into the database for each insert command and simultaneously setting a code field associated with the new record to a first value,
 responsive to each delete command in the second transaction, setting the associated code field of an identified record to be deleted to a second value,
 setting the state parameter to a POST-UPDATE state at the completion of the last two steps,
 during the post-UPDATE state, for each record identified in the second transaction, deleting the record if its associated code field is set to the second value and otherwise changing the value of the code field to a third value,
 setting the state parameter to the NON-UPDATE state at the completion of the last step,
 in response to a database query identifying match criteria of a record to be accessed, rejecting the query operation unless the system state parameter is set to the NON-UPDATE state and the associated code field of any record satisfying the match criteria is set to the third value, or the state parameter is set to the UPDATE state and the associated code field of any record satisfying the match criteria is set to the second or third values, or the state parameter is set to the POST-UPDATE state and the associated code field of any record satisfying the match criteria is set to the first or third values.

* * * * *